Figure 1:
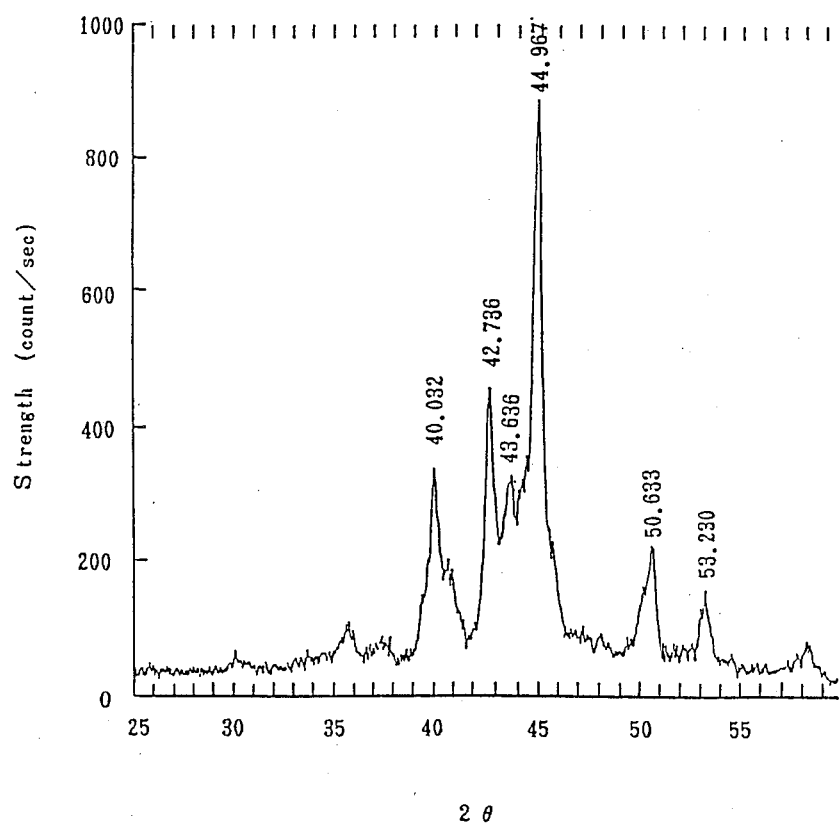

United States Patent [19]

Arase et al.

[11] Patent Number: 4,931,198

[45] Date of Patent: Jun. 5, 1990

[54] MAGNETIC PARTICLES COMPOSED MAINLY OF FEC AND A PROCESS FOR PREPARING SAME

[75] Inventors: Takuya Arase, Settsu; Katsushi Tokunaga, Suita; Shigeo Daimon, Osaka, all of Japan

[73] Assignee: Daikin Industries Ltd., Osaka, Japan

[21] Appl. No.: 408,955

[22] Filed: Sep. 18, 1989

Related U.S. Application Data

[63] Continuation of Ser. No. 104,994, Oct. 6, 1987, abandoned.

[30] Foreign Application Priority Data

Oct. 6, 1986 [JP] Japan .................................. 237714

[51] Int. Cl.$^5$ ...................... C01B 31/30; C01B 35/56
[52] U.S. Cl. ............................. 252/62.51; 423/439
[58] Field of Search ...................... 252/62.51; 423/439

[56] References Cited

U.S. PATENT DOCUMENTS 3,572,993  3/1971  Rogers .................................. 423/439
4,668,414  5/1987  Okamura et al. ................ 252/62.51

FOREIGN PATENT DOCUMENTS 179490  4/1986  European Pat. Off. ......... 252/62.56

OTHER PUBLICATIONS

Brown et al., "Chem Abst.", vol. 95, 1981, 173340a.
Sakai et al., "Chem Abst.", vol. 100, 1984, 106131s.
Wayman, "Chem Abstr.", vol. 64, 12272d.

*Primary Examiner*—Jack Cooper
*Attorney, Agent, or Firm*—Armstrong, Nikaido, Marmelstein, Kubovcik & Murray

[57] ABSTRACT

Particles containing FeC are prepared by mixing (a) a boron compound or alkaline earth metal compound with (b) iron oxyhydroxide or iron oxide particles, or coating the former compound (a) to the latter particles (b), and then carburizing the mixture or coated particles with a carburizing agent.

4 Claims, 1 Drawing Sheet

MAGNETIC PARTICLES COMPOSED MAINLY OF FEC AND A PROCESS FOR PREPARING SAME

This is a continuation of application Ser. No. 104,994, filed Oct. 6, 1987, now abandoned.

The present invention relates to particles containing an iron carbide, particularly FeC, process for preparing them and use thereof.

As magnetic materials for magnetic recording are conventionally used γ-iron oxide, cobalt-containing γ-iron oxide, chromium dioxide, etc. However, attention is recently drawn to particles containing an iron carbide in view of excellence in coercive force, electroconductivity and hardness thereof. The particles containing an iron carbide are known to contain $Fe_5C_2$ as a main component of iron carbides, and further $Fe_3O_4$ and free carbon atom. Although, various kinds of iron carbides are known, those containing $Fe_5C_5$ or $Fe_3C$ as a main component are only useful as a magnetic recording material. Particles containing other iron carbide as a main component are not known to be useful as a magnetic recording material.

An object of the invention is to provide novel particles containing an iron carbide composed mainly of FeC, a process for preparing them and use thereof.

The above and other objects of the invention will become apparent from the following description.

The present invention provides particles containing FeC. These particles are prepared, for example, by mixing (a) a boron compound or alkaline earth metal compound with (b) iron oxyhydroxide or iron oxide particles, or coating the former compound (a) to the latter particles (b), and then carburizing the mixture or coated particles with a carburizing agent.

Examples of preferred iron oxyhydroxides are α-FeOOH (goethite), β-FeOOH (akaganite) and γ-FeOOH (lepidocrosite). Examples of preferred iron oxides are α-$Fe_2O_3$ (hematite), γ-$Fe_2O_3$ (maghemite) and $Fe_3O_4$ (magnetite).

α-$Fe_2O_3$ is, for example, any of one prepared by heating α-FeOOH, β-FeOOH or γ-FeOOH at about 200° to about 350° C., followed by dehydration, α-$Fe_2O_2$ prepared by heating the resulting product further at about 350° to about 900° C. to compact the crystals, and others. Further, γ-$Fe_2O_3$ is, for example, any of one prepared by reducing iron oxyhydroxide or α-$Fe_2O_3$ in a hydrogen atmosphere at 300° to 400° C. and reoxidizing the resulting $Fe_3O_4$ in air at 150° to 250° C. β-FeOOH is preferably treated with an aqueous solution of alkaline compound.

In the present invention, examples of boron compounds are boric acid and borates such as sodium borate, ammonium borate, etc. Alkaline earth metal compounds include $Ca(OH)_2$, $CaCO_3$ and like calcium salts, $Ba(OH)_2$, $BaCO_3$ and like barium salts, etc. The proportion of the boron compound or alkaline earth metal compound to iron oxyhydroxide or iron oxide is preferably 0.1 to 20 atom% and more preferably 0.1 to 5 atom% of boron or alkaline earth metal based on iron.

Boron compound or alkaline earth metal compound is mixed or coated by a conventional mixing or coating method. For example, these compounds are mixed with use of a ball mill, mixer, etc. Alternately, a slurry of the starting iron compound and boron compound or alkaline earth metal compound is, for example, dried with or without filtration. In case boron compound or alkaline earth metal compound is dissolved in water, an aqueous solution of alkaline compound is added dropwise to the slurry, if required, stirred for 30 minutes to one hour, and the resulting precipitates are filtered up and dried.

In the present invention, as the carburizing agents are used the following reducing-and-carburizing agents containing carbon atom.

① CO

② aliphatic, linear or cyclic, saturated or unsaturated hydrocarbons such as methane, propane, butane, cyclohexane, methylcyclohexane, acetylene, ethylene, propylene, butadiene, isoprene, town gas, etc.

③ aromatic hydrocarbons such as benzene, toluene, xylene, alkylated or alkenylated derivatives thereof having a boiling point up to 150° C.

④ aliphatic alcohols such as methanol, ethanol, propanol, cyclohexanol, etc.

⑤ esters such as methyl formate, ethyl acetate and like ester having a boiling point up to 150° C.

⑥ ethers such as lower alkyl ether, vinyl ether and like ether having a boiling point up to 150° C.

⑦ aldehydes such as formaldehyde, acetaldehyde and like aldehyde having a boiling point up to 150° C.

⑧ ketones such as acetone, methyl ethyl ketone, methyl isobutyl ketone and like having a boiling point up to 150° C.

Particularly preferable reducing-and-carburizing agent containing carbon atom are CO, $CH_3OH$, $HCOOCH_3$, saturated or unsaturated aliphatic hydrocarbons having 1 to 5 carbon atoms.

In the carburization of the present invention, the mixture or coated particles are contacted with a carburizing agent. The carburizing agent can be used together with a reducing gas containing no carbon atom such as hydrogen gas. The reducing gas containing no carbon atom is used preferably in an amount of up to 5 times the volume of the carburizing agent at the vapor phase.

In the present invention, the carburizing agent can be used as it is or as diluted. Examples of diluents are $N_2$, argon, helium, etc. The dilution ratio is suitably selected but is preferably up to about 10 times (by volume). The contacting temperature, contacting time, gas flow rate and other conditions depend, for example, on the preparation history, average axial ratio, average particle size and specific surface area of the iron oxyhydroxide or iron oxide. The preferred contacting temperature is about 250° to about 400° C., preferably about 300° to about 400° C. The preferred contacting time is about 0.5 to about 12 hours. The preferred gas flow rate (excluding diluent) is about 1 to about 1000 ml S.T.P./min per gram of the starting iron compound. The contacting pressure inclusive of that of the diluent is usually 1 to 2 atom. although not particularly limited.

Before carburizing in the process of the invention, the mixture or coated particles may be contacted with a reducing gas containing no carbon atom such as hydrogen gas. In the above, the reducing gas containing no carbon atom can be used as it is or as diluted. Examples of diluents are $N_2$, $CO_2$, argon, helium, etc. The dilution ratio is suitably selected but is preferably up to about 10 times (by volume). The contacting temperature, contacting time, gas flow rate and other conditions depend, for example, on the preparation history, average axial ratio, average particle size and specific surface are of the iron compound. The preferred contacting tempertion is about 200° to about 700° C., preferably about 300° to about 400° C. The preferred contacting time is about 0.5 to about 6 hours. The preferred gas flow rate (excluding diluent) is about 1 to about 1000 ml S.T.P./min per gram of the starting iron compound. The contacting pressure inclusive of that of the diluent is usually 1 to 2 atom. although not particularly limited.

The particles obtained by the present process are in the form of generally uniform particles when observed under an electron microscope. The particles are present as primary particles and have the same particulate form as the starting particles of iron oxyhydroxide or iron oxide. The particles obtained by the process are found to contain carbon by elementary analysis and to contain an iron carbide by its X-ray diffraction pattern, which exhibits plane spacings at 2.01 Å, 2.11 Å and 2.25 Å. Such pattern corresponds to FeC. The iron carbide component of the present material chiefly comprises FeC.

In the case of incomplete carburization, the particles obtained by the present process further contain an iron oxide component which is chiefly $Fe_3O_4$. With respect to iron oxides, FeO, $Fe_3O_4$ and $\gamma$-$Fe_2O_3$ are generally related to one another in structure. The oxygen atoms in these three oxides are packed in a three-dimensional structure to the highest possible density, and the number of oxygen atoms in $Fe_3O_4$ actually present varies in an overall range covering the numbers of oxygen atoms in these oxides, so that it is suitable to represent the iron oxide in the particles by $FeO_y$ ($1 < y \leq 1.5$).

While the particles prepared by the present process contain iron oxide in addition to the iron carbide component in most cases, the elementary analysis values of C, H and N indicate that the amount of carbon is usually excess of that calculated from the chemical formula of the iron carbide identified by the X-ray diffraction pattern. It is not clear whether the excess of carbon is present as combined with iron or as free carbon. In this sense, it is probable that the particles obtained by the present process contain elemental carbon. The particles obtained by the present process are then composed substantially of iron carbide alone or iron carbide and iron oxide and/or elemental carbon.

The particles prepared by the present process generally have an average particle size (long axis) of 0.05 to 5 μm, and an average axial ratio (long axis/short axis) of not less than 1.

In case the present particles are used as a magnetic material for magnetic recording, the particles have an average axial ratio usually of at least 3, preferably 3 to 20, and an average particle size (long axis) usually of up to 2 μm, preferably 0.1 to 2 μm, most preferably 0.1 to 1.0 μm.

The particles of the present invention containing iron carbide are useful as a magnetic material for magnetic recording as is apparent from the foregoing characteristics, etc., while the use thereof is not limited thereto. For example, the particles are usable as a catalyst for preparing lower aliphatic hydrocarbons from CO and $H_2$.

The present invention provides a process for preparing particles containing FeC with use of the starting iron compound which is easily available.

The invention will be described below in detail with reference to examples.

In the following examples, characteristics, etc. are determined in the methods described below.

(1) Magnetic characteristics.

Determined in the following method unless otherwise specified.

Coercive force (Hc, Oe), saturation magnetization ($\sigma s$, e.m.u.) and remanent magnetization ($\sigma r$, e.m.u.) are measured in a magnetic field with a strength of 10 kOe, using a vibrating sample magnetometer.

FIG. 1 shows the X-ray diffraction pattern of the powder obtained in Example 1.

EXAMPLE 1

Ten grams of goethite particles, 0.7 μm in average size (long axis), 10 in average axial ratio and having surface pH of 9, and 0.07 g of boric acid (B/Fe=1 atom%) were mixed in a ball mill for 3 hours. After the resulting powder was heated in air at 350° C. for one hour, the powder was treated at 340° C. for 3 hours while passing CO at a flow rate of 200 ml/min. FIG. 1 shows the X-ray diffraction pattern of the product and Table 1 gives comparison between each peak of the product and that of ASTM X-Ray Powder Data File 6-0686 of FeC.

TABLE 1

| Example 1 | | | FeC (ASTM) | |
|---|---|---|---|---|
| 2θ (deg) | dÅ | $I/I_1$ | dÅ | $I/I_1$ |
| 40.032 | 2.250 | 35 | 2.255 | 35 |
| 42.736 | 2.114 | 50 | 2.119 | 45 |
| 43.636 | 2.072 | 34 | | |
| 44.967 | 2.014 | 100 | 2.016 | 100 |
| 50.633 | 1.801 | 21 | 1.805 | 30 |
| 53.230 | 1.719 | 14 | 1.719 | 15 |

From Table 1, it is shown that the product comprises FeC as a main component. Further, a peak at 2.072 Å is deemed to be that of $Fe_5C_2$. Magnetic characteristics of the obtained powder are as follows.

Coercive force 740 Oe
Saturation magnetization 96.9 emu/g
Remanent magnetization 42.3 emu/g

EXAMPLE 2

To a slurry containing 10 g of goethite particles, 0.7 μm in average size (long axis), 10 in average axial ratio and having surface pH of 9, and 0.125 g of calcium chloride (Ca/Fe=1 atom%) and adjusted the pH to 3 with addition of hydrochloric acid was added dropwise an aqueous solution of sodium hydroxide to adjust the pH to 13. The slurry was filtered, washed, dried and the resulting lumps were pulverized. After the resulting powder was heated in air at 350° C. for one hour, the powder was contacted at 340° C. for 3 hours by passing CO at a flow rate of 200 ml/min. The X-ray diffraction pattern showed the product comprises FeC as a main component. Magnetic characteristics of the obtained powder are as follows.

Coercive force 900 Oe
Saturation magnetization 103.5 emu/g
Remanent magnetization 51.6 emu/g

What is claimed:

1. Magnetic particles for use in a magnetic recording medium composed mainly of FeC having an average particle size of 0.1 to 2 μm and an average axial ratio of 3 to 20.

2. A process for preparing magnetic particles for use in a magnetic recording medium composed mainly of FeC having an average particle size of 0.1 to 2 μm and an average axial ratio of 3 to 20, comprising:

mixing (a) a boron compound or alkaline earth metal compound with (b) iron oxyhydroxide or iron oxide particles having an average axial ratio of 3 to 20, and an average particles size of 0.1 to 2 μm, or coating the former compound (a) to the latter particles (b), the proportion of the boron compound or alkaline earth metal compound to iron oxyhydroxide or iron oxide being 0.1 to 20 atom % boron or alkaline earth metal based on iron, and then carburizing the mixture or coated particles with a carburizing agent selected from the group consisting of CO, methanol, methyl formate and a saturated or unsaturated aliphatic hydrocarbon having 1 to 5 carbon atoms at a temperature of about 250° to about 400° C.

3. A process as defined in claim 2, wherein the boron compound is boric acid, sodium borate or ammonium borate.

4. A process as defined in claim 2, wherein the alkaline earth metal compound is $Ca(OH)_2$, $CaCO_3$, $Ba(OH)_2$ or $BaCO_3$.

* * * * *